(12) United States Patent
Khaydarov

(10) Patent No.: US 6,546,027 B1
(45) Date of Patent: Apr. 8, 2003

(54) LASER SATURABLE ABSORBER AND PASSIVE NEGATIVE FEEDBACK ELEMENTS, AND METHOD OF PRODUCING ENERGY OUTPUT THEREFROM

(75) Inventor: Dzhakhangir V. Khaydarov, Campbell, CA (US)

(73) Assignee: Hoya Photonics, Inc., Santa Clara, CA (US)

( * ) Notice: Subject to any disclaimer, the term of this patent is extended or adjusted under 35 U.S.C. 154(b) by 0 days.

(21) Appl. No.: 09/452,661

(22) Filed: Dec. 1, 1999

(51) Int. Cl.⁷ .................................................. H01S 3/11
(52) U.S. Cl. ........................................... 372/10; 372/98
(58) Field of Search .................. 371/18, 11, 98, 371/83, 70

(56) References Cited

U.S. PATENT DOCUMENTS

| | | |
|---|---|---|
| 3,774,120 A | 11/1973 | Ross |
| 3,878,478 A | 4/1975 | Drexhage |
| 4,019,156 A | 4/1977 | Fountain et al. |
| 4,268,801 A | 5/1981 | Stappaerts |
| 4,395,769 A | 7/1983 | Damen et al. |
| 4,446,557 A | 5/1984 | Figueroa |
| 4,490,822 A | 12/1984 | Walling et al. |
| 4,723,248 A | 2/1988 | Harter et al. |
| 4,760,577 A | 7/1988 | Aoshima |
| 4,833,333 A * | 5/1989 | Rand ..................... 250/492.3 |
| 4,846,561 A | 7/1989 | Soileau, Jr. et al. |
| 4,854,676 A * | 8/1989 | Kalyanaraman ............ 359/243 |
| 4,932,031 A | 6/1990 | Alfano et al. |
| 4,969,156 A | 11/1990 | Schiller et al. |
| 4,980,566 A * | 12/1990 | Heilweil ................ 250/339.07 |
| 5,052,013 A | 9/1991 | Putnam |
| 5,065,407 A * | 11/1991 | Pax ............................ 372/103 |
| 5,119,382 A | 6/1992 | Kennedy et al |
| 5,175,664 A * | 12/1992 | Diels ....................... 359/392 . |
| 5,251,229 A | 10/1993 | Bennett, Jr. et al. |
| 5,285,467 A | 2/1994 | Scheps |
| 5,363,192 A | 11/1994 | Diels et al. |

(List continued on next page.)

OTHER PUBLICATIONS

Kim, Nam Seong et al. (1995) "A Passively Q–Switched Nd:YAG Laser with a Variable Pulse Width Using LiF:F–over 2 Color–Center Crystal in a Dual–Cavity Configuration," *Japanese Journal of Applied Physics* Part 2, 34(3A):L303 (Mar.).

Kubecek, Vaclav et al. (1991) "Actively and Passively Mode–Locked Nd:YAP(YAI0₃)Laser with Negative Feedback Using CdSe and GaAs," *Japanese Journal of Applied Physics* 30(11A):L1889–L1891 (Nov. ).

(List continued on next page.)

*Primary Examiner*—Paul Ip
*Assistant Examiner*—Gioacchino Inzirillo
(74) *Attorney, Agent, or Firm*—Darby & Darby

(57) ABSTRACT

The present invention is directed to a pulsed, mode-locked, picosecond laser having a solid-state laser medium, a saturable absorber (SA), and a passive negative feedback (PNF) element. The SA is "slow", having an absorption recovery time which is longer than a desired duration of an output pulse. The SA and the PNF element together mode-lock the laser to produce an output pulse or pulses of the desired duration. Thus, according to the method of the invention, the solid-state laser medium is energized, whereupon the laser becomes mode-locked to produce the desired output pulses. The solid-state laser of the present invention is capable of producing very short, energetic output pulses, such as output pulses having a duration on the order of one or more picoseconds, and an energy of from about 100 µJ to about 2 mJ. These output pulses are very stable. As the laser is of relatively simple construction, it is relatively easy to operate to produce this stable energy output.

57 Claims, 5 Drawing Sheets

U.S. PATENT DOCUMENTS

| | | | |
|---|---|---|---|
| 5,367,528 A | | 11/1994 | Diels et al. |
| 5,539,764 A | | 7/1996 | Shields et al. |
| 5,654,974 A | | 8/1997 | Stultz |
| 5,802,083 A | * | 9/1998 | Birnbaum .................... 372/11 |
| 5,802,084 A | | 9/1998 | Bowers et al. |
| 5,982,797 A | * | 11/1999 | Mirov ......................... 372/42 |
| 6,002,697 A | * | 12/1999 | Govorkov .................... 372/34 |
| 6,252,892 B1 | * | 6/2001 | Jiang ........................... 372/11 |

OTHER PUBLICATIONS

Lewis, Michele A. (1982) "Active–passive Mode–Locked Nd:YAG Oscillator," *Applied Optics* 21(16):2897–2900 (Aug.).

Pax, Paul (1991) "Novel Large Mode Volume Resonator," *IEEE Journal of Quantum Electronics* 27(5):1242–1246 (May).

Piskarskas, A. et al. (1990) "Modern Picosecond– and Femtosecond–Pulse Solid–State Lasers," *Izvestiya Akademii Nauk SSSR Seriya Fizicheskaya* 54(12):2299–2312 (No month).

Seilmeier, A. et al. (1978) "Narrow–Band Tunable Infrared Pulse with Sub–Picosecond Time Resolution," *Optics Comunications* 24(3):237–242 (Mar.).

Stappaerts, E.A. et al. (1978) "Mode Locking with a Slow Saturable Absorber in a Transverse Resonator," *Optics Letters* 3(6):226–228 (Dec.).

Haus, Hermann A. (1975) "Theory of Mode Locking with a Slow Saturable Absorber," *IEEE Journal of Quantum Electronics* QE–11(9)736–746 (Sep.).

Heinz, P. et al. (1990) "Feedback–controlled Mode–locking Operation of Nd–doped Crystal Lasers," *J. Opt. Soc. Am. B* 7(2):182–186 (Feb.).

Kalisky, Y. et al. (1996) "$Cr^{4+}$ Doped Garnets: Their Properties as Non–Linear Absorbers," *Optical Materials* 6:275–280 (Nov.).

Keller, Ursala et al. (1996) "Semiconductor Saturable Absorber Mirrors (SESAM's) for Femtosecond to Nanosecond Pulse Generation in Solid–State Lasers," *IEEE Journal of Selected Topics in Quantum Electronics* 2(3):435–453 (Sep.).

Agnesi, A. et al. (1992) "Generation of Extended Pulse Trains of Minimum Duration by Passive Negative Feedback Applied to Solid State Q–Switched Lasers," *IEEE Journal of Quantum Electronics* 28(3):710–719 (Mar.).

Basiev, T.T. et al.(1993) "Q Switching of a Periodic–Pulse–Pumped Industrial Nd:YAG Laser by Means of F–2–LiF Crystals," *Quantum Electronics* 23(6):513 (Jun.).

Boggess, Jr., Thomas F. et al. (1985) "Optical Limiting in GaAs," *IEEE Journal of Quantum Electronics* QE–21(5):488–494 (May).

Chang, Tallis Y. et al. (1995) "Electro–Optic Power Limiter: Broadband, Self–Actuating Optical limiter for Visible and Infrared Radiation," *Mat. Res. Soc. Symp. Proc.* 374:61–71 (No month).

* cited by examiner

LASER SATURABLE ABSORBER AND PASSIVE NEGATIVE FEEDBACK ELEMENTS, AND METHOD OF PRODUCING ENERGY OUTPUT THEREFROM

FIELD OF THE INVENTION

The present invention relates generally to lasers, and more particularly, to solid state lasers capable of producing output pulses of very short duration. The lasers of the present invention are particularly useful in producing energetic output pulses, each having a duration in the picosecond range.

BACKGROUND OF THE INVENTION

Lasers producing picosecond output pulses, or "picosecond lasers", are useful in many scientific applications. For example, a parametric laser cavity producing high-power, tunable, picosecond pulses, is the most efficient tool for nonlinear-optical studies of narrow-band transitions in the near- and mid-infrared spectral regions. The Nd-based, solid-state laser, having an Nd-doped active medium, is the most common and widely used picosecond laser.

Generally, picosecond lasers, such as the Nd-based, solid-state laser, are constructed in one of two ways in order to generate the energetic, picosecond pulses. In a first example, the laser contains a regenerative amplifier (RGA) for amplifying a seed pulse from about 10 mJ up to the moderate level of 1 to 10 mJ. The laser also contains a power amplifier for boosting the pulse energy further up to about 100 mJ. Such a laser is usually built using a hybrid system consisting of a low-power, diode-pumped, continuous-wave, mode-locked laser, and pulsed, flashlamp-pumped, regenerative and power amplifiers. As this laser combines two different laser platforms, it is both expensive and complicated to use. In the second example, the laser contains a pulsed oscillator for generating a short pulse of 1 to 10 mJ, and a power amplifier for amplifying the pulse power to about 100 mJ. As both the oscillator and the amplifier are built using the same components, operation of this laser is greatly simplified.

The Nd-based picosecond laser described above requires a saturable absorber (SA) with a fast recovery time, or a "fast SA". The fast SA used in most of the previous pulsed picosecond lasers is a dye solution. While a dye solution operates fairly reliably, it must be replaced and maintained on a regular basis. There is a need for an alternative to a dye solution that would not require replacement and maintenance over the lifetime of the laser, such as a solid-state SA.

Progress has been made in the development of fast, semiconductor-based SAs for mode-locking solid-state lasers. However, while these fast, solid-state SAs perform successfully in continuous-wave lasers, they have not been reported as being operable in pulsed, solid-state lasers.

Slow, solid-state SAs can produce ultra-short pulses, provided fast gain depletion or soliton formation occurs in the laser resonator. Unfortunately, these conditions are difficult to obtain in pulsed, flashlamp-pumped $Nd^{3+}$:YAG lasers.

The $Cr^{4+}$:YAG crystal has certain characteristics that make possible its use as an SA for passively Q-switching Nd-based lasers. One of these characteristics is its strong absorption band near 1060 nm that allows it to be pumped with an Nd-based laser and to be used as an SA for such a laser. Another of these characteristics is its absorption recovery time of about 8 $\mu$sec that makes it a good SA for passively Q-switching an Nd-based laser. For an SA to perform well as a passive mode-locker, however, the SA must have an absorption recovery time similar to, or shorter than, the desired duration of a laser output pulse. Because of its relatively long absorption recovery time, the $Cr^{4+}$:YAG crystal (a "slow SA") cannot passively mode-lock the laser to produce picosecond pulses.

Thus, the problem of simplifying the pulsed, solid-state, picosecond laser by replacing the fast SA dye solution remains. The $Nd^{3+}$:YAG picosecond laser using the fast SA dye solution typically produces output pulses of 30 to 40 picoseconds. A negative feedback technique can be used to control pulse duration and energy stability in mode-locked lasers. For example, a passive negative feedback element can be used to shorten the pulse duration of the $Nd^{3+}$:YAG picosecond laser with the fast SA dye solution to 10 to 15 picoseconds. There remains a need for a pulsed, solid-state, laser for generating short picosecond pulses of stable energy, which laser does not require the fast SA dye solution. Additionally, there is a need for a pulsed, mode-locked, picosecond laser which is simple to use and very stable. It is an object of the present invention to provide such a laser.

SUMMARY OF THE INVENTION

The present invention is directed to a pulsed, mode-locked, picosecond laser which is simple to use and very stable. The laser is a solid-state laser having a solid-state laser medium, such as an $Nd^{3+}$-doped crystal, a saturable absorber (SA), and a passive negative feedback (PNF) element.

In the laser of the present invention, the SA element is "slow", having an absorption recovery time which is longer than a desired duration of an output pulse. Typically, this slow SA would not be capable of operating well on its own as a passive mode-locker. In the present invention, however, the SA and PNF elements together mode-lock the laser to produce an output pulse or pulses of the desired duration. Thus, according to the method of the invention, the solid-state laser medium is energized, whereupon the laser becomes mode-locked to produce the desired output pulses.

Preferably, the inventive laser has an $Nd^{3+}$:YAG laser medium. The slow SA may be a $Cr^{4+}$-doped crystal or an $LiF:(F_2)^-$ color center crystal, for example, and is preferably a $Cr^{4+}$:YAG crystal. The PNF element may be a GaAs or a CdSe element, for example, and is preferably a GaAs wafer. The solid-state laser of the present invention is capable of producing very short, energetic output pulses, such as output pulses having a duration on the order of one or more picoseconds, such as from about 1 to about 200 picoseconds, and an energy of from about 100 $\mu$J to about 2 mJ. The laser produces very stable output pulses. As the laser is of relatively simple construction, it is relatively easy to operate to produce this stable energy output.

DESCRIPTION OF PREFERRED EMBODIMENTS

Figure 1:
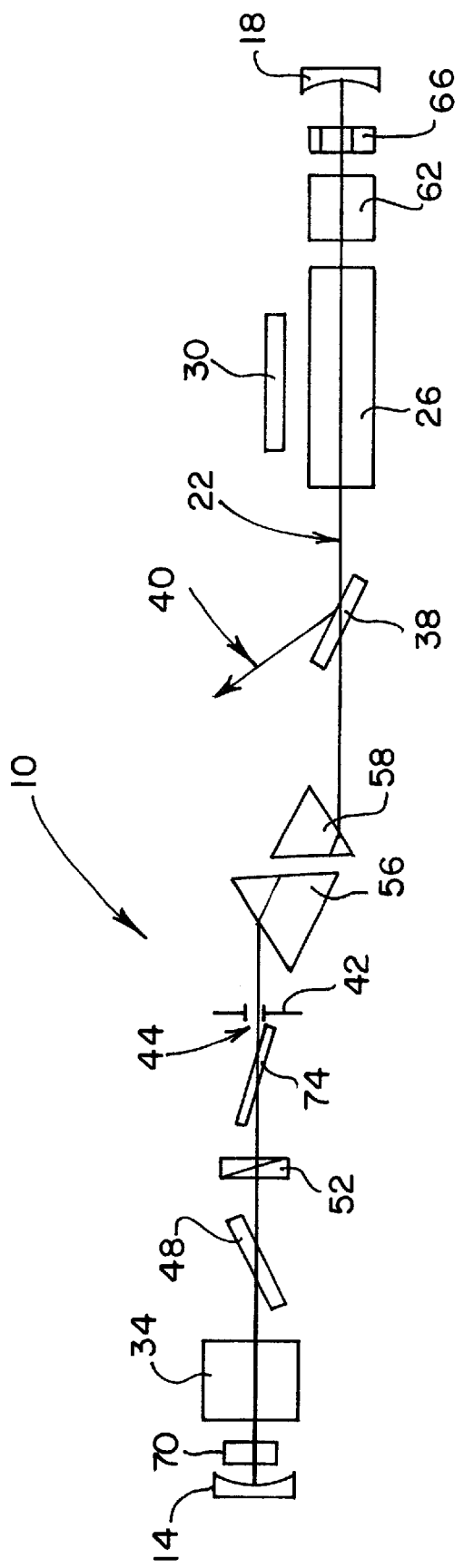
FIG. 1 is a schematic illustration of a laser, according to the present invention.

FIG. 1 is a schematic illustration of a laser 10 that defines a cavity, or a resonator cavity. The cavity is bounded by a reflective surface 14 at one end and another reflective surface 18 at an opposite end. Merely by way of convenience, the one end and the opposite end may be referred to as the proximal end and the distal end, respectively. The reflective surface is preferably a highly reflective surface, such as a highly reflective mirror. The reflective surface may be planar or concave, and is preferably, concave. The reflective surface 14 and the reflective surface 18 may differ in one or more characteristics, such as the degree of reflectivity, the degree of planarity or concavity, and the like. A pathway for radiant beams is established between the two surfaces 14 and 18, as schematically represented by line 22. The length of the beam pathway may be from about 50 cm to about 200 cm, and preferably, from about 80 cm to about 120 cm, such as about 90 cm. The pathway for a beam making a round-trip of the resonator cavity is twice the length of the length of the beam pathway.

The laser has various elements arranged between the proximal and distal ends, along the beam pathway, as shown in FIG. 1. One of these elements is a solid-state laser medium 26, which may be an $Nd^{3+}$-doped crystal, or rod, although other media are possible. Preferably, the solid-state laser medium 26 is an $ND^{3+}$:YAG crystal. Operably associated with the solid-state medium 26 is a source of pulsed energy 30 for energizing the medium, such as one or more flashlamps, as schematically illustrated in FIG. 1. The source of pulsed energy 30 is operably connected to an electrical power supply (not shown) which may provide from about 5 to about 20 Joules per pulse of energy, such as about 17.5 Joules per pulse of energy. When the solid-state medium 26 is energized by the source of pulsed energy 30, at least one beam of radiant light energy, or laser energy, is produced within the cavity.

An acousto-optic mode-locker 34 is also provided along the beam pathway within the cavity. The acousto-optic mode-locker 34 has a resonance that defines the optimum length of the resonator cavity. Merely by way of example, the mode-locker 34 may have a resonance of about 70 MHz, such that the optimum optical length of the resonator cavity is about 107 cm. In operation, the mode-locker 34 initiates the formation of pulses of radiant energy within the cavity. That is, the acousto-optic mode-locker 34 ensures that the radiant light energy produced when the solid-state medium 26 is energized, is in or takes the form of pulses of radiant energy within the cavity, and that there is only one pulse of radiant energy traveling in the cavity.

A means for providing an energy output from the cavity (schematically represented by arrow 40) is also provided along the beam pathway within the cavity. This means is sufficient for providing an energy output of at least one pulse having an energy of from about 100 µJ to about 2 mJ and a duration on the order of one or more picoseconds. Herein, "duration" refers the full width half maximum (FWHM) duration, and either or both terms may be used interchangeably unless specifically indicated otherwise. The means for providing the energy output from the cavity may include a partially reflecting optical element 38 that directs an output beam out of the cavity, such as a polarizer or a thin-film polarizer. The energy output means may further include a Pockels cell 62. When energized by an applied voltage, the Pockels cell 62 functions as a quarter-wave element that rotates polarization of the transmitted beam by 90 degrees after 2 passes (i.e., one pass toward and one pass away from the reflective surface 18). In general, the Pockels cell 62 may be replaced by a quarter-wave plate that is rotated through a small angle. Such a plate would partially couple the whole pulse train to the output. The same result could be achieved by replacing the reflective surface 18 with a partially transmitting mirror, or output coupler.

The laser cavity also houses a beam-limiting element 42 that defines an aperture 44, or pinhole. The aperture 44 is aligned with the beam pathway. In operation, a radiant beam from the solid-state laser medium 26 travels in a proximal direction toward the beam-limiting element 42. When the beam reaches the beam-limiting element 42, only a portion of the beam passes through the beam-limiting aperture 44 and continues on toward the proximal reflective surface 14. The portion of the beam passing through the aperture is defined, at least in part, by the size of the aperture. Merely by way of example, the aperture may have a diameter of from about 0.3 to about 0.7 mm, and preferably, from about 0.4 to about 0.6 mm, about 0.5 mm being typical. A further portion of the beam diverges on the proximal side of the aperture, predominantly as a result of diffraction as the edges of the aperture. When a portion of the beam reaches the reflective surface 14, it, or some portion of it (depending on the reflectivity of the surface 14), is reflected in a distal direction toward the beam-limiting element 42. The portion of the beam passing through the beam-limiting aperture 44 diverges at least to some extent on the distal side of the aperture, again, predominantly as a result of diffraction at the edges of the aperture. The divergence of a portion of the beam, the flatness or curvature of the reflective surface 14, and the length of the cavity from the proximal reflective surface 14 to the distal reflective surface 18, may be selected to collimate the beam as desired. Collimation of the beam is controlled mostly by the radius of the reflective surface 18, which may be about 3 m. Collimation of the beam is preferred, but not necessary.

The laser may include other elements, such as the following: a partially reflecting optical element 48, for example, a polarizer or a thin-film polarizer; a half-wave plate 52; means 56 for providing an adjustable delay line, for example, two prisms 56 and 58; a Pockels cell 62, as described above; and a soft apodizer 66. The adjustable delay line is used to match the cavity length to the resonant frequency of the acousto-optic mode-locker 34, although alternately, this could be achieved by adjusting the position of one of the reflective surfaces 14 and 18. Preferably, the elements described above are arranged along the beam pathway as shown in FIG. 1, to optimize the output energy and the beam size. Other configurations are possible, taking into account the following: (1) the solid-state medium 26 and the Pockels cell 62, if any, should be on the same side of the polarizer 38 to provide maximum output; (2) the acousto-optic mode-locker 34 and the SA element 70 should be as close as possible to the reflective surface 14 to ensure that only single pulse is oscillating; and (3) the PNF element 74 should be as close as possible to the aperture 44 to ensure that the intensity of the beam propagating through the PNF element toward reflective surface 14 is as high as possible.

According to the present invention, the laser cavity includes a "slow" saturable absorber (SA) element 70 that has an absorption recovery time that is longer than a desired duration of an output pulse. As described above, the desired duration of an output pulse is on the order of one or more picoseconds. The SA element 70 is arranged along the beam pathway, adjacent one of the proximal reflective surface 14 and the distal reflective surface 18. The SA element may be a solid-state element, such as a $Cr^{4+}$-doped crystal or an $LiF:(F_2)^-$ color center crystal. Preferably, the SA element is a $Cr^{4+}$-doped crystal, such as a $Cr^{4+}$:YAG crystal.

Optimization tests were conducted on $Cr^{4+}$:YAG samples of varying dopant concentration and physical thickness. In these tests, it was generally observed that for a particular dopant concentration, a higher unsaturated absorption in the sample, or greater sample length, corresponded to a shorter pulse duration. It was also generally observed that for a particular sample length, a higher dopant concentration corresponded to a shorter pulse duration.

The SA element is preferably of a certain dopant concentration and/or a certain physical thickness or physical length. For example, for a $Cr^{4+}$-doped SA element, the concentration of $Cr^{4+}$ may be from about 0.05 to about 1 atomic percent, and preferably, from about 0.5 to about 0.6 atomic percent. Further by way of example, for a $Cr^{4+}$-doped SA element, such as a $Cr^{4+}$:YAG crystal, the element may have a thickness of from about 1 mm to about 40 mm, and preferably, from about 2 mm to about 5 mm. As the dimension of the $Cr^{4+}$:YAG crystal along the optical axis is shorter than the transverse dimension, physical thickness is used to define the dimension along the optical axis of the crystal. An $LiF:(F_2)^-$ color center crystal has a maximum linear absorption coefficient that is about an order of magnitude lower than that of a $Cr^{4+}$:YAG crystal. Thus, an $LiF:(F_2)^-$ color center SA element may have a length of from about 20 to about 50 mm. As the dimension of the $LiF:(F_2)^-$ color center crystal along the optical axis is typically longer than the transverse, physical length is used to define the dimension along the optical axis of the crystal. The SA element may have a certain linear unsaturated absorption that can be expressed in terms of an optical density (OD). Preferably, the optical density of the SA element is from about 0.5 OD to about 1 OD.

The laser cavity also includes a passive negative feedback (PNF) element 74. Negative feedback is a very powerful technique used to control the duration of pulses and the stability of energy produced by passively or actively-passively mode-locked lasers. Passive negative feedback techniques provide various advantages over active negative feedback techniques, such as an instantaneous response capability and an ability to operate without additional high-voltage and high-speed electronics. The passive negative feedback technique is thus employed in the operation of the laser of the present invention.

The PNF element 74 is arranged along the beam pathway, and preferably, proximally adjacent the beam-limiting element 42, as shown in FIG. 1. Preferably, the PNF element is disposed at about a Brewster angle relative to the beam pathway. The PNF element may be composed of a semi-insulating material, or a substantially dopant-free semiconductor material, as such material can be used to make an efficient solid-state, optical-limiting element having a fast response time. The PNF element demonstrates two-photon absorption at certain wavelengths. Thus, the PNF element may be made of an appropriate semi-insulating material that has a two-photon absorption band located in an appropriate spectral range for the solid-state medium 26, such as an Nd-doped medium. When the PNF element undergoes two-photon absorption, free carriers are generated such that the refractive index of the element decreases.

Preferably, the PNF element is a solid-state element, such as a GaAs or CdSe wafer, that demonstrates two-photon absorption at wavelengths appropriate for an Nd-doped laser medium. For example, a semi-insulating GaAs wafer demonstrates such absorption near a wavelength of from about 0.9 to about 1.7 $\mu m$. This absorption leads to the generation of free-carriers, that in turn, leads to a reduction in the refractive index of at least a portion of the PNF element that is aligned with the center of a beam traveling along the beam pathway. The refractive index distribution across the PNF element, that results from the beam distribution there across, creates a negative lens. Thus, when a beam of radiant energy of a certain wavelength reaches the PNF element 74, the PNF element demonstrates two-photon absorption, such that the PNF element behaves as a negative lens. A beam of radiant energy traveling in a proximal direction through this negative lens diverges as it leaves the lens and continues on toward the reflective surface 14. When the beam is reflected back, traveling in a distal direction through this negative lens, it diverges further as it approaches the beam-limiting element 42. As the beam travels further in the distal direction through the beam-limiting aperture 44, it experiences additional losses. The beam thus experiences significant additional losses when traveling a relatively long pass from the PNF element 74 to the reflective surface 14 and back through the PNF element and the aperture 44.

Figure 2:
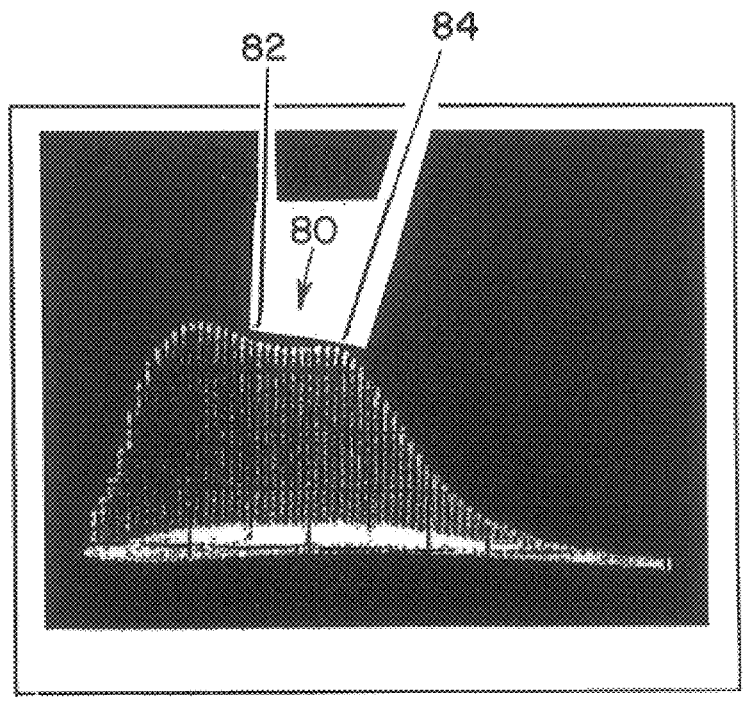
FIG. 2 is a graphical illustration of a pulse train produced by a laser of the present invention, wherein the x-axis represents time (nsec), the y-axis represents pulse amplitude (mV), the full screen in the x-direction represents 500 nsecs, and the full screen in the y-direction represents 1600 mV.

The negative lens described above is formed almost instantaneously when an intense portion of the pulse reaches the PNF element 74. The negative lens then decays within a few nanoseconds, before the pulse returns to the PNF element during another round-trip through the resonator cavity. A pulse of high intensity produces a stronger negative lens in the PNF element, and thus, produces higher losses, than a pulse of lower intensity. The intracavity intensity and the output energy of the laser are thus stabilized at a level (defined by the PNF element) that is lower than that achieved by a laser having no PNF element. As a lower amount of energy is extracted from the laser medium 26 on each round-trip of the resonator cavity, the pulse train produced by the laser is extended, and thus, rendered more stable. The PNF element thus stabilizes the output pulse energy produced by the laser. A stable pulse train produced by a laser of the present invention, including its PNF element, is shown in FIG. 2.

Generally, a PNF element transmits the leading, low-intensity edge of a pulse with substantially no loss, or relatively little loss, and transmits the intense peak of the pulse and the tail of the pulse with losses. The PNF element effectively shortens the duration of the pulse on every round-trip of the resonator cavity until equilibrium is reached. When a PNF element is used with a typical $Nd^{3+}$:YAG laser, including its fast SA dye solution, the pulse duration becomes about 10 to about 15 picoseconds, as opposed to the typical 30 to 40 picoseconds associated with an $Nd^{3+}$:YAG laser lacking a PNF element. The laser according to the present invention, including its "slow" SA and PNF elements, demonstrated a pulse-shortening phenomena such as that associated with the typical $Nd^{3+}$:YAG laser. The SA and the PNF elements together passively mode-lock the laser to produce at least one short, energetic output pulse of radiant energy, for example, at least one output pulse having a duration on the order of one or more picoseconds and an energy of from about 100 µJ to about 2 mJ. By way of example, the output pulse may have a duration of from about 1 to about 200 picoseconds, preferably, from about 10 to about 120 picoseconds, and most preferably, from about 80 to about 100 picoseconds.

Experiments were conducted using a laser of the configuration shown in FIG. 1. The laser was a modification of a laser based on the original diffraction-filtered resonator (DFR) design that is described in Pax, Paul and Weston, Jeremy, *Novel Large Mode Volume Resonator,* IEEE Journal of Quantum Electronics, Vol. 27, No. 5, May, 1991, and U.S. Pat. No. 5,065,407 to Pax, the entireties of which are incorporated herein by these references. More particularly, the DFR-based laser was modified to include the PNF element and to replace the fast SA dye solution with the "slow" SA element described above. Typically, the laser is acousto-optically, or actively, mode-locked to initiate pulse formation. In a case in which the laser was not actively mode-locked (i.e., no power was supplied to the acousto-optic mode-locker), the laser generated a single nanosecond pulse. In another case in which the laser—absent the PNF element—was actively mode-locked, it generated a train of seven pulses wherein the FWHM duration of the train was about 30 nanoseconds. Such a pulse train is similar to that produced by a laser with a fast SA and no PNF element. The pulse energy in the middle of the train was about 15 mJ, and the pulse duration, as measured by a streak camera, was about 500 picoseconds. This relatively long pulse duration may be attributed to the shortness of the pulse development time because of passive Q-switching and the lack of a shortening effect from a fast SA.

Figure 3:
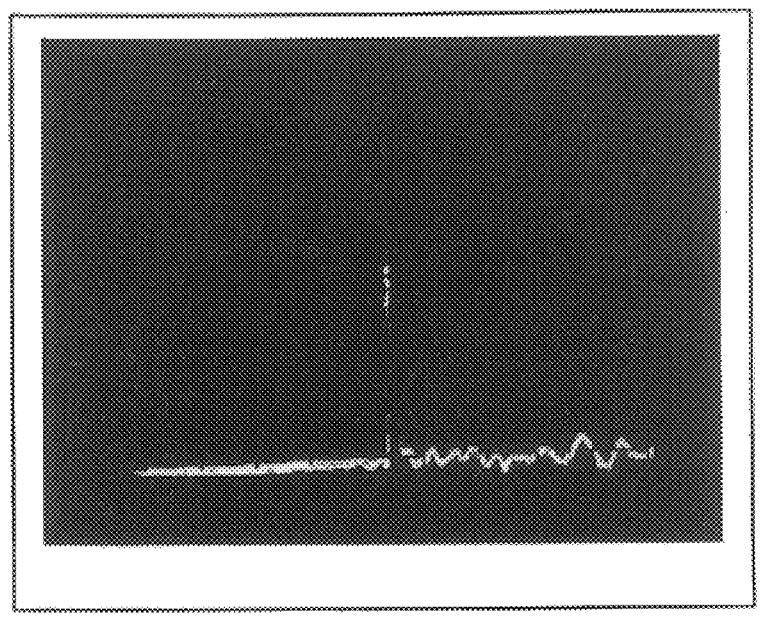
FIG. 3 is a graphical illustration of a pulse switched out of the pulse train shown in FIG. 2, wherein the x-axis represents time (nsec), the y-axis represents pulse amplitude (mV), the full screen in the x-direction represents 100 nsecs, and the full screen in the y-direction represents 1000 mV.

In a further case in which the laser—including the PNF element (here, a 0.625 mm-thick, semi-insulating, GaAs wafer)—was actively mode-locked, it generated a pulse train of over 40 pulses, wherein the train had a FWHM duration of about 300 nanoseconds. Elongation of a pulse train is a distinctive feature of lasers operating with a PNF element. The pulse train had a flat, central part 80, as shown in FIG. 2. FIG. 3 shows a pulse that was switched out of the laser cavity in the middle of this flat, central part of the train. The switched-out pulse had a duration, or FWHM duration, of about 95 picoseconds and an energy of about 1.5

Figure 4:
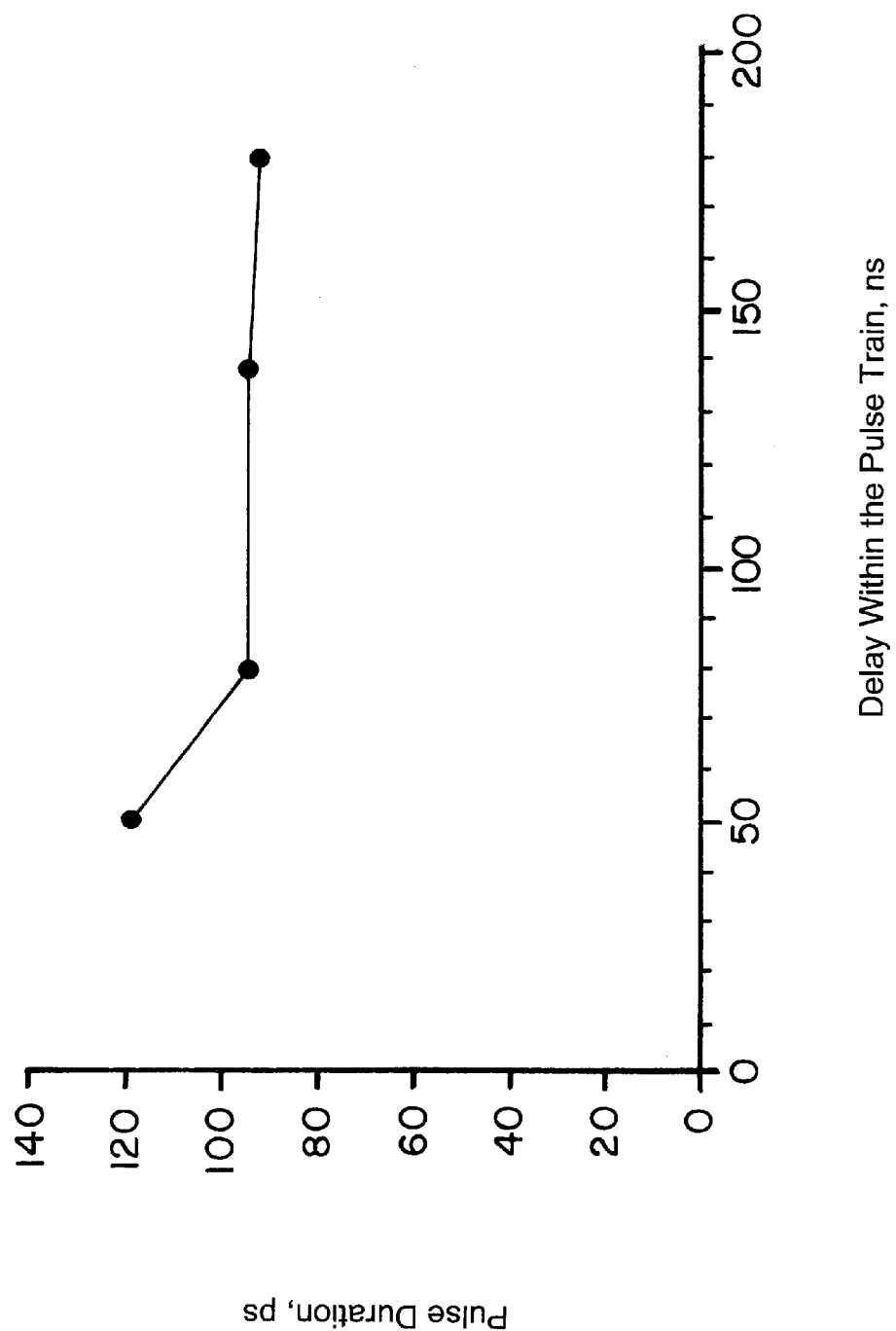
FIG. 4 is a graphical plot of pulse duration (psec) as a function of a position of a pulse in a pulse train, as represented by delay within the pulse train (nsec), produced by a laser of the present invention.

The duration of a pulse produced by a laser of optimal resonator length was demonstrated to be dependent on the position of the pulse in the pulse train, as shown in FIG. 4. That is, a pulse at the approximate beginning of the flat part 80 of the pulse train, as represented by reference point 82 of FIG. 2, had a greater duration (about 120 picoseconds) than that of a pulse at the approximate center region of the flat part 80 (about 95 picoseconds) and a pulse at the approximate tail region of the flat part (about 92 picoseconds), as represented by reference point 84 of FIG. 2. The duration of pulses from the approximate center and tail regions of the flat part 80 was at an approximately steady-state value of from about 92 to about 95 picoseconds. The pulse duration data shows that the SA element is shaping (here, sharpening) the front of the pulse up to a point at which the SA element becomes fully saturated and transparent (i.e., at the peak of the pulse train). The pulse duration data also shows that shaping of the pulse continues even when the SA element is already fully saturated and transparent. The shaping (here, sharpening) of the tail of the pulse is attributed to the PNF element. That is, the demonstrated shortening of the pulse is attributed to the action of the PNF element in shortening the pulse by slicing out its tail.

Figure 5:
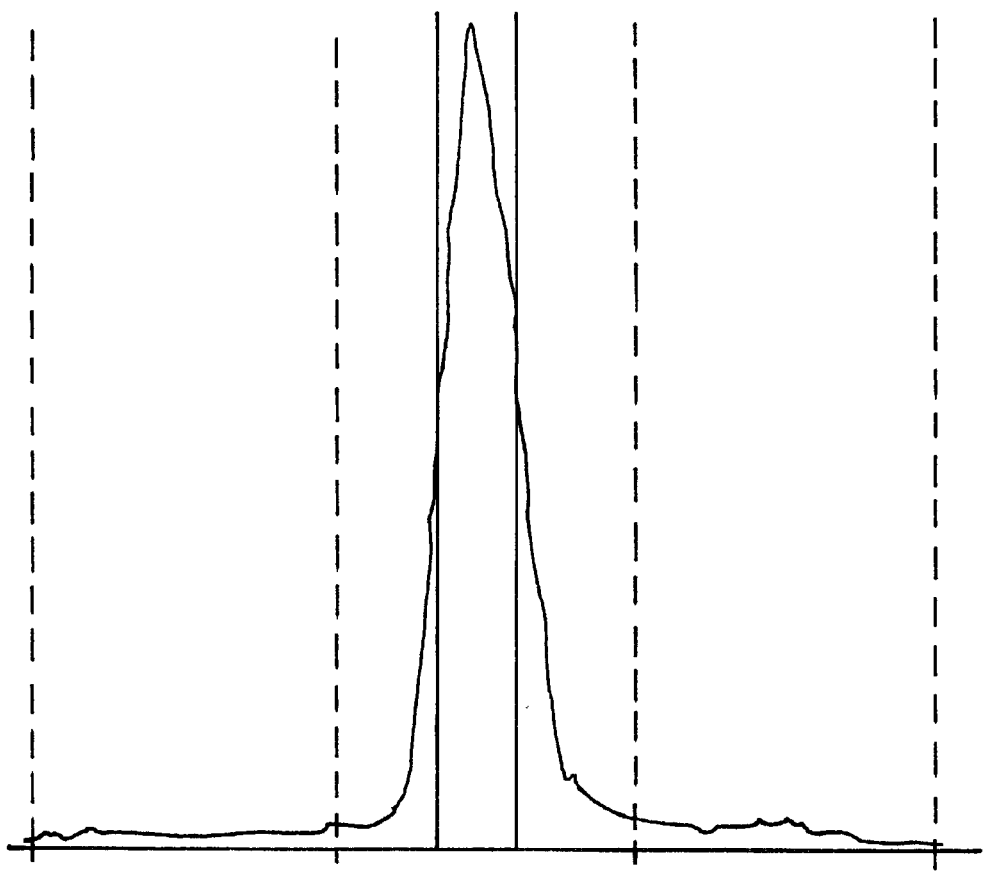
FIG. 5 shows a streak camera trace of a pulse produced by a laser of the present invention that has an optimum resonator length, wherein the distance between adjacent vertical lines represents about 250 picoseconds.

It might be expected that the asymmetry in the shape of the pulse train would result in an asymmetric output pulse. However, the streak camera trace of FIG. 5 shows an output pulse produced by the laser that is substantially symmetric over time. This substantially symmetric output pulse was produced by a laser of optimum resonator length as defined by the resonance of the acousto-optical mode-locker 34. This output pulse had a duration of about 95 picoseconds. By way of explanation, the streak camera used to obtain the streak camera trace of FIG. 5 is sensitive to light having a wavelength in the visible spectrum, but not to light having other wavelengths, such as 1064 nm. Thus, measurements were made based on the second harmonic of the beam pulse at 532 nm. The second harmonic pulse has a duration that is about 1.414 shorter than that of the beam pulse (if there is no saturation). By way of example, a second harmonic pulse having a duration of about 66.5 picoseconds corresponds to a beam pulse duration of about 95 picoseconds, such as the FWHM duration of the output pulse shown in FIG. 5.

Lasers having resonator lengths that are shorter than optimum produce output pulses of longer duration than those produced by lasers of optimum resonator length. For example, an output pulse produced by a laser 150 µm shorter than the optimum length had a duration of about 110 picoseconds and that produced by a laser 220 µm shorter than the optimum length had a duration of about 115 picoseconds. Lasers having resonator lengths that are longer or shorter than the optimum resonator length, for example, from about 100 µm longer to about 100 µm shorter, may produce substantially symmetrical pulses, such as the substantially bell-shaped pulse of FIG. 5, although the symmetry may not be as good as that shown in FIG. 5.

Figure 6:
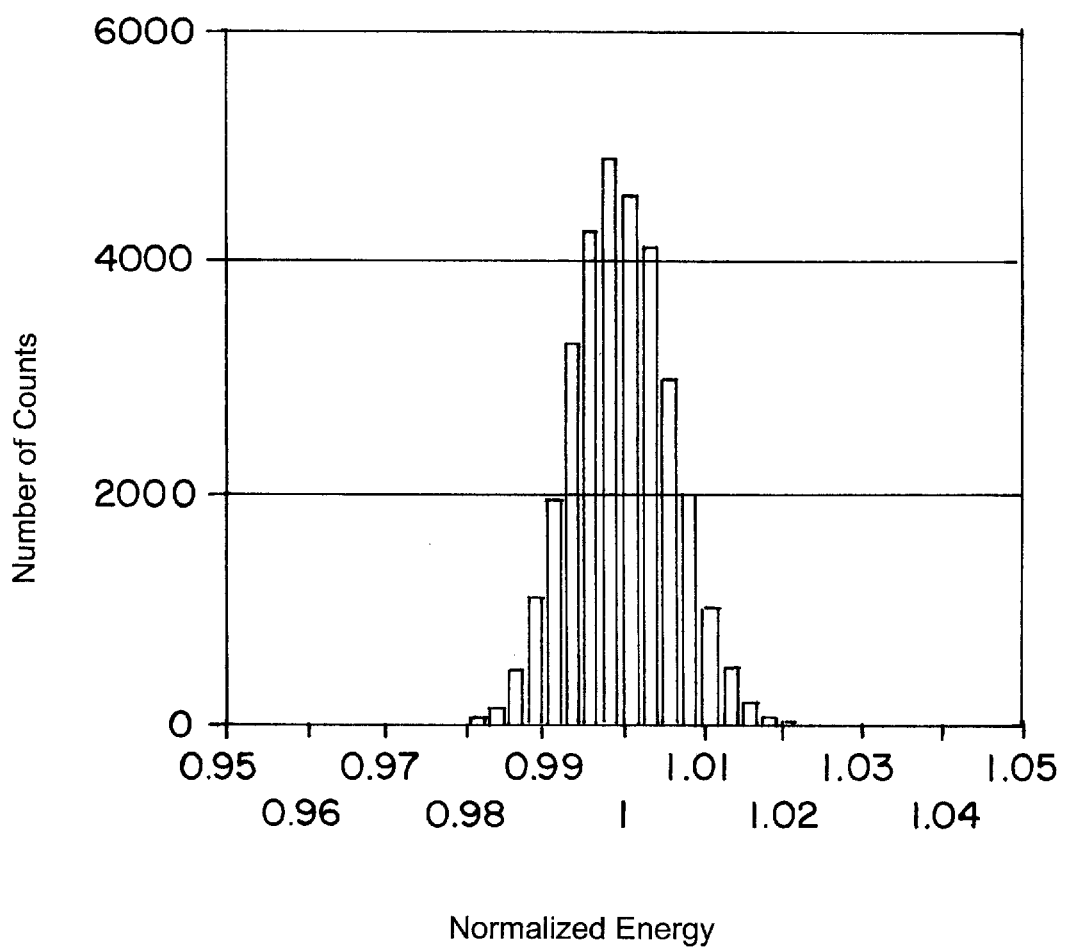
FIG. 6 is a graphical representation of statistical data associated with the output of a laser of the present invention, wherein the x-axis represents normalized energy and the y-axis represents a number of counts.

The output of the laser according to the present invention was demonstrated to be very stable. FIG. 6 is a graphical representation of statistical data associated with a laser output of over 30,000 pulses, where the x-axis represents the normalized energy and the y-axis represents the number of counts of pulses having particular energy. The standard deviation of the energy of the output pulses was 0.6% and 99% of the output pulses fell within a window of ±1.6%. These data demonstrate a very stable laser output.

The laser may be used to produce a desirable pulse train of from about 10 to about 200 pulses, and preferably, from about 20 to about 80 pulses. Optimal results, in terms of energy stability and pulse shape, or symmetry, for example, have been obtained from a laser, according to the present invention, used to produce a pulse train of from about 25 to about 30 pulses. The pulse train may have a duration of from about 50 nanoseconds to about 1400 nanoseconds, and preferably, from about 100 nanoseconds to about 500 nanoseconds. By way of example, optimal results have been obtained from a laser, according to the present invention, used to produce a pulse train of a duration of about 200 nanoseconds.

The laser of the present invention is a pulsed solid-state laser of relatively simple construction, capable of generating stable, energetic picosecond output pulses. As described above, a slow SA element and a PNF element are advantageously combined to produce such a laser. That is, the PNF element provides the desirable instantaneous response characteristic of the passive negative feedback technique and the desirable shortening of pulse duration, and, in combination with the slow SA element, assists in mode-locking the laser.

The laser of the present invention, with its slow SA element and its PNF element, operates much as an actively-passively mode-locked laser, with a PNF element and a fast SA, operates. These two different lasers produce energy output of similar characteristics, including the shape of the pulse train (elongated and flat-topped), the evolution of the pulse train, and the stability of output pulses. Thus, the present invention provides a pulsed, solid-state laser for generating short picosecond pulses of stable energy, which laser does not require a fast SA dye solution. The laser is simple to use and very stable. The present invention also provides an advantageous method of producing energy output from such laser.

It is to be understood that while the invention has been described above in conjunction with preferred specific embodiments, the description is intended to illustrate and not to limit the scope of the invention, as defined by the appended claims.

It is claimed:

1. A laser defining a cavity, the cavity housing a proximal reflective surface, a distal reflective surface, a beam pathway therebetween, and, along the beam pathway, a solid-state laser medium, a source of pulsed energy for energizing the laser medium, means providing an energy output from the cavity, and a beam-limiting element, the laser comprising:
   a saturable absorber (SA) element along the beam pathway for Q-switching the laser, said SA element having an absorption recovery time which is longer than a desired duration of an output pulse, the desired duration being on an order of one or more picoseconds; and
   a passive negative feedback (PNF) element along the beam pathway;
   the laser sufficient to produce at least one output pulse having the desired duration and an energy of from about 100 µJ to about 2 mJ.

2. The laser of claim 1, wherein the laser medium comprises a $Nd^{3+}$-doped crystal.

3. The laser of claim 1, wherein the laser medium comprises a $Nd^{3+}$:YAG crystal.

4. The laser of claim 1, wherein at least one of the proximal and distal reflective surfaces comprises a highly reflective mirror.

5. The laser of claim 1, wherein the beam-limiting element defines an aperture for beam passage therethrough.

6. The laser of claim 1, wherein said SA element is disposed distally adjacent the proximal reflective surface.

7. The laser of claim 1, wherein said SA element comprises a solid-state element.

8. The laser of claim 1, wherein said SA element comprises a $Cr^{4+}$-doped crystal.

9. The laser of claim 8, wherein said SA element comprises a $Cr^{4+}$:YAG crystal.

10. The laser of claim 9, wherein said SA element has a $Cr^{4+}$ concentration of from about 0.05 to about 1 atomic percent.

11. The laser of claim 10, wherein said SA element has a $Cr^{4+}$ concentration of from about 0.5 to about 0.6 atomic percent.

12. The laser of claim 9, wherein said SA element has a dimension along an optical axis thereof that is from about 1 mm to about 40 mm.

13. The laser of claim 12, wherein said SA element has a dimension along an optical axis thereof that is from about 2 mm to about 5 mm.

14. The laser of claim 1, wherein said SA element comprises an $LiF:(F_2)^-$ color center crystal.

15. The laser of claim 14, wherein said SA element has a dimension along an optical axis thereof that is from about 20 to about 50 mm.

16. The laser of claim 1, wherein said SA element has an optical density from about 0.5 OD to about 1 OD.

17. The laser of claim 1, wherein said PNF element is disposed proximally adjacent the beam-limiting element.

18. The laser of claim 1, wherein said PNF element is disposed at about a Brewster angle with respect to the beam pathway.

19. The laser of claim 1, wherein said PNF element is composed of a semi-insulating material.

20. The laser of claim 1, wherein said PNF element is composed of a material having a two-photon absorption band.

21. The laser of claim 1, wherein said PNF element comprises a solid-state element.

22. The laser of claim 1, wherein said PNF element comprises a GaAs or a CdSe element.

23. The laser of claim 1, wherein said PNF element assists in stabilizing an output of the laser.

24. The laser of claim 1, wherein said PNF element acts as an optical limiter.

25. The laser of claim 1, wherein said PNT element acts as a negative lens when a beam pulse impinges thereon.

26. The laser of claim 25, wherein the negative lens is of a strength which depends on an intensity of the beam pulse.

27. The laser of claim 25, wherein the beam pulse loses energy along the beam pathway from said PNF element through the beam-limiting element.

28. The laser of claim 27, wherein an amount of energy lost depends on an intensity of the beam pulse.

29. The laser of claim 1, wherein the energy output comprises a pulse train of from about 10 pulses to about 200 pulses.

30. The laser of claim 29, wherein the energy output comprises a pulse train of from about 20 pulses to about 80 pulses.

31. The laser of claim 1, wherein the energy output comprises a pulse train having a duration of from about 50 nanoseconds to about 1400 nanoseconds.

32. The laser of claim 31, wherein the energy output comprises a pulse train having a duration of from about 100 nanoseconds to about 500 nanoseconds.

33. The laser of claim 1, wherein the energy output comprises a pulse train which is asymmetric over time.

34. The laser of claim 1, wherein the output pulse has a duration of from about 1 picosecond to about 200 picoseconds.

35. The laser of claim 34, wherein the output pulse has a duration of from about 10 picoseconds to about 120 picoseconds.

36. The laser of claim 1, wherein the length of the beam pathway is from about 50 cm to about 200 cm.

37. The laser of claim 36, wherein the length of the beam pathway is from about 80 cm to about 120 cm.

38. The laser of claim 1, wherein the output pulse is substantially symmetrical over time.

39. The laser of claim 38, wherein the output pulse is substantially bell-shaped.

40. A method of producing energy output from a laser, the laser defining a beam pathway therein and housing a solid-state laser medium and a source of pulsed energy for energizing the laser medium, the method comprising:
   providing a saturable absorber (SA) element along the beam pathway for Q-switching the laser, the SA element having an absorption recovery time which is longer than a desired duration of an output pulse, the desired duration being on an order of one or more picoseconds;

providing a passive negative feedback (PNF) element along the beam pathway; and energizing the laser medium to produce at least one output pulse having the desired duration and an energy of from about 100 µJ to about 2 mJ.

41. The method of claim 40, wherein the laser medium comprises a $Nd^{3+}$:YAG crystal.

42. The method of claim 40, wherein the SA element comprises a solid-state element.

43. The method of claim 40, wherein the SA element comprises a $Cr^{4+}$-doped crystal or an $LiF:(F_2)^-$ color center crystal.

44. The method of claim 40, wherein the SA element comprises a $Cr^{4+}$:YAG crystal.

45. The method of claim 40, wherein the PNF element comprises a solid-state element.

46. The method of claim 40, wherein the PNF element comprises a GaAs or a CdSe element.

47. The method of claim 40, wherein the PNF element assists in stabilizing the energy output of the laser.

48. The method of claim 40, wherein the PNF element acts as a negative lens when a beam pulse impinges thereon.

49. The method of claim 40, wherein the energy output comprises a pulse train of from about 10 pulses to about 200 pulses.

50. The method of claim 49, wherein the energy output comprises a pulse train of from about 20 pulses to about 80 pulses.

51. The method of claim 40, wherein the energy output comprises a pulse train having a duration of from about 50 nanoseconds to about 1400 nanoseconds.

52. The method of claim 51, wherein the energy output comprises a pulse train having a duration of from about 100 nanoseconds to about 500 nanoseconds.

53. The method of claim 40, wherein the energy output comprises a pulse train which is asymmetric over time.

54. The method of claim 40, wherein the output pulse has a duration of from about 1 picosecond to about 200 picoseconds.

55. The method of claim 54, wherein the output pulse has a duration of from about 10 picoseconds to about 120 picoseconds.

56. The method of claim 40, wherein the output pulse is substantially symmetrical over time.

57. The method of claim 56, wherein the output pulse is substantially bell-shaped.

\* \* \* \* \*